E. MORRIS.
Preparation of Solder for Sealing Oyster and Fruit Cans.
No. 140,840.                              Patented July 15, 1873.
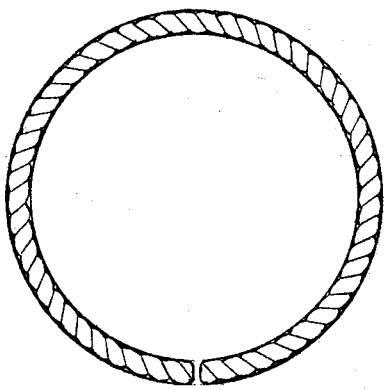
WITNESSES.                    INVENTOR.

UNITED STATES PATENT OFFICE.

EDMUND MORRIS, OF BURLINGTON, NEW JERSEY.

IMPROVEMENT IN THE PREPARATION OF SOLDER FOR SEALING OYSTER AND FRUIT CANS.

Specification forming part of Letters Patent No. 140,840, dated July 15, 1873; application filed December 3, 1872.

*To all whom it may concern:*

Be it known that I, EDMUND MORRIS, of Burlington, New Jersey, have invented an Improvement in the Preparation of Solder for more Convenient Use by Tinners in the Capping of Cans containing Fruits, Vegetables, Oysters, &c., of which the following is a specification:

My improvement consists in taking the ordinary wire made of solder and twisting together one or more strands, as shown in the drawing. By thus twisting a strand or by uniting two or more strands into a cord the exterior will contain a multitude of small depressions. The wire is then converted into rings by winding it on a wooden cylinder of the required diameter. A cut is then made through the wire the whole length of the cylinder, when the rings readily slip off. The rings are then coated with rosin or any other suitable flux, in any way most convenient. The depressions just mentioned become filled with it, and hold a sufficient body of rosin for soldering purposes. When the quantity of rosin required is very small the plain wire may be used.

Great savings of time, solder, and rosin will be secured when the coated ring is applied to the capping of tin cans. When so applied no more solder and rosin need be consumed than actually necessary to solder on the cap, as the supply is accurately graduated to the work to be done; hence there will be none of the present large waste of solder and rosin now unavoidable from using an unregulated quantity; nor will there be any of the smearing of the clean bright top of the can, as now occurs, by the superabundant quantity of rosin dusted all over the top by the workman. This excess melts under the combined heat of the contents of the can with that of the soldering-iron, and then it sticks to the tin, causing it to collect dirt, and to be otherwise very objectionable.

As the rosin-coated ring contains the exact quantity of flux and solder needed for soldering on the cap, and is dropped by the operator directly on the circular joint to be soldered up, the two, in the form of the described ring, can, by one motion of the hand, be put exactly where they are required—that is, in a depression or circular gutter in the top made expressly to receive the solder. The ring at once nearly fills it, leaving no overflow, and also dispenses with the slow process of melting off the solder from a bar by repeated touches of the soldering-iron, in doing which the waste of solder occurs. It also relieves the operative from picking up his dredging-box and dusting the rosin on the can. More than one-half of the solder is saved, and at least three-quarters of the rosin.

I claim as my invention—

A ring made of solder-wire, coated or supplied with rosin, substantially as described, and for the purpose set forth.

EDMUND MORRIS.

Witnesses:
JOHN A. VANDEGRIFT,
GEO. H. WOOLMAN.